United States Patent
Yamasaki et al.

(10) Patent No.: US 10,523,078 B2
(45) Date of Patent: Dec. 31, 2019

(54) MOTOR AND METHOD OF MANUFACTURING MOTOR

(71) Applicant: Nidec Corporation, Kyoto (JP)

(72) Inventors: Yuta Yamasaki, Kyoto (JP); Tsukasa Takaoka, Kyoto (JP); Shoki Yamazaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 197 days.

(21) Appl. No.: 15/791,448

(22) Filed: Oct. 24, 2017

(65) Prior Publication Data

US 2018/0123416 A1 May 3, 2018

(30) Foreign Application Priority Data

Oct. 31, 2016 (JP) .................... 2016-213573

(51) Int. Cl.
| | |
|---|---|
| *H02K 11/30* | (2016.01) |
| *H02K 3/38* | (2006.01) |
| *H02K 11/33* | (2016.01) |
| *H02K 1/27* | (2006.01) |
| *H02K 15/00* | (2006.01) |
| *H02K 15/095* | (2006.01) |
| *F04D 25/06* | (2006.01) |

(52) U.S. Cl.
CPC .............. *H02K 3/38* (2013.01); *H02K 1/2786* (2013.01); *H02K 11/33* (2016.01); *H02K 15/0056* (2013.01); *H02K 15/095* (2013.01); *F04D 25/06* (2013.01)

(58) Field of Classification Search
CPC . H02K 3/38; H02K 1/27; H02K 11/33; H02K 15/00; H02K 15/095; H02K 1/2786; H02K 15/0056; H02K 3/522; H02K 15/0062; F04D 25/06
See application file for complete search history.

(56) References Cited

U.S. PATENT DOCUMENTS

| | | | | |
|---|---|---|---|---|
| 2008/0054735 | A1* | 3/2008 | Yoshida ................. | H02K 3/522 310/43 |
| 2009/0096304 | A1* | 4/2009 | Yang ................... | F04D 25/0613 310/91 |

(Continued)

FOREIGN PATENT DOCUMENTS

| | | |
|---|---|---|
| CN | 205647222 U | 10/2016 |
| JP | 2014-217208 A | 11/2014 |

*Primary Examiner* — Naishadh N Desai
(74) *Attorney, Agent, or Firm* — Keating & Bennett, LLP

(57) ABSTRACT

A motor includes a stator, a rotor that rotates relatively to the stator, a circuit board, and a holding member that holds the stator and the circuit board. The stator includes a stator core including a core back and teeth, an insulator covering a portion of the stator core, a coil with a coil wire wound around the teeth with the insulator in between, and a coil end portion being an end portion of the coil wire. The circuit board has a second through hole. The holding member has a first through hole disposed on a lower side of the second through hole. The coil end portion passes through the first and second through holes and is electrically connected to the circuit board. A lower portion of the holding member is connected to an upper portion of the insulator, and an upper portion thereof is connected to the circuit board.

20 Claims, 12 Drawing Sheets

(56) References Cited

U.S. PATENT DOCUMENTS

| | | | |
|---|---|---|---|
| 2011/0081258 A1* | 4/2011 | Yoshida | H02K 3/522 417/321 |
| 2013/0020885 A1* | 1/2013 | Hsieh | H02K 5/128 310/43 |
| 2014/0015350 A1* | 1/2014 | Yoshida | H02K 5/20 310/50 |
| 2015/0357878 A1* | 12/2015 | Fukunaga | H02K 3/50 310/71 |

* cited by examiner

MOTOR AND METHOD OF MANUFACTURING MOTOR

CROSS REFERENCE TO RELATED APPLICATIONS

This application claims the benefit of priority to Japanese Patent Application No. 2016-213573 filed on Oct. 31, 2016. The entire contents of this application are hereby incorporated herein by reference.

BACKGROUND OF THE INVENTION

1. Field of the Invention

The present invention relates to a motor and a method of manufacturing the motor.

2. Description of the Related Art

Various structures related to a stator in a fan motor or the like usable for a blower fan device is proposed in the related art. For example, Japanese Unexamined Patent Application Publication No. 2014-217208 discloses the stator structure as follows.

The stator structure of the brushless motor disclosed in Japanese Unexamined Patent Application Publication No. 2014-217208 is provided with a stator core, an insulator formed of an insulating material mounted on the stator core, and a coil wound around the insulator. The insulator includes a first insulator mounted in the axial direction from one surface side of the stator core and a second insulator mounted in the axial direction from the other surface side of the stator core.

A terminal pin formed of a long rectangular pin is mounted on the first insulator and the second insulator. At one end of the terminal pin, the end of the coil is tied. The other end of the terminal pin is passed through a through hole of a circuit board.

In recent years, an output power of the fan motor and the like is increased, and it is necessary to increase a wire diameter of the coil. In a case where the wire diameter of the coil is thick, the wire diameter at the end of the coil is larger than the diameter of the terminal pin in the structure as described in Japanese Unexamined Patent Application Publication No. 2014-217208, and it is difficult to tie the coil ends to the terminal pin.

Therefore, as a measure against thickening of the wire diameter of the coil, for example, a structure in which a coil end portion is directly extended to the circuit board and connected to the circuit board is considered.

Here, Japanese Unexamined Patent Application Publication No. 2014-138499 discloses a motor having a wire support that suppresses a positional deviation of a lead wire extended from a coil and maintains the lead wire in a state extending substantially in the axial direction. The wire support is fixed to an insulator fixed to a stator core by snap fitting in which claws of the wire support and the insulator are hooked with each other. A bus bar holder is fixed to a top plate portion included in a housing. The lead wire extended from the coil extends in the axial direction through a cutout of the wire support and a holder hole of the bus bar holder. The end portion of the lead wire is electrically connected to the terminal of the bus bar above the upper surface of the bus bar holder.

However, in Japanese Unexamined Patent Application Publication No. 2014-138499, it is necessary to align the positions of the wire support and the terminal of the bus bar when assembling the motor.

SUMMARY OF THE INVENTION

An exemplary motor of the present invention includes a stator, a rotor, a circuit board, and a holding member. The rotor rotates relatively about a central axis extending in an up-and-down direction with respect to the stator. The holding member holds the stator and the circuit board. The stator includes a stator core, an insulator, a coil, and a coil end portion. The stator core includes a core back and a plurality of teeth disposed to the core back radially about the central axis. The insulator covers at least a portion of the stator core. In the coil, a coil wire is wound around the teeth with the insulator in between. The coil end portion is an end portion of the coil wire. The holding member has a first through hole. The circuit board has a second through hole. The first through hole is disposed on a lower side of the second through hole. The coil end portion passes through the first through hole and the second through hole and is electrically connected to the circuit board. A lower portion of the holding member is connected to an upper portion of the insulator. An upper portion of the holding member is connected to the circuit board.

An exemplary method of manufacturing a motor of the present invention includes a removing step, a first connecting step, and a second connecting step. The motor includes a stator, a rotor rotating relatively about a central axis extending in an up-and-down direction with respect to the stator, a holding member having a first through hole, and a circuit board having a second through hole. The stator has a stator core, an insulator, a coil, and a coil end portion. The stator core includes a core back and a plurality of teeth disposed to the core back radially about the central axis. The insulator covers at least a portion of the stator core. In the coil, a coil wire is wound around the teeth with the insulator in between. The coil end portion is an end portion of the coil wire. In the removing step, coating of the coil end portion in the stator is removed. In the first connecting step, the circuit board is connected to the holding member so that the first through hole and the second through hole face each other in the up-and-down direction. In the second connecting step, the holding member to which the circuit board is connected is connected to the insulator, and the coil end portion is passed through the first through hole and the second through hole.

According to the exemplary motor and method of manufacturing a motor of the present invention, the assembling efficiency can be improved in the configuration in which the coil end portion is directly connected to the circuit board.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary embodiments of the present invention will be described with reference to the drawings. In the following description, the direction in which a central axis of a motor extends is referred to as "up-and-down direction". A radial direction about the central axis is simply referred to as "radial direction", and a circumferential direction about the central axis is simply referred to as "circumferential direction". However, the up-and-down direction does not indicate the positional relationship and direction when incorporated in an actual device. In addition, in the present application, the shape and positional relationship of each part will be described with a circuit board side as an upper side with respect to a coil. As a result, in each drawing, the upper side is denoted by X1 and the lower side is denoted by X2.

<1. Overall Configuration of Blowing Fan Device>

Figure 1:
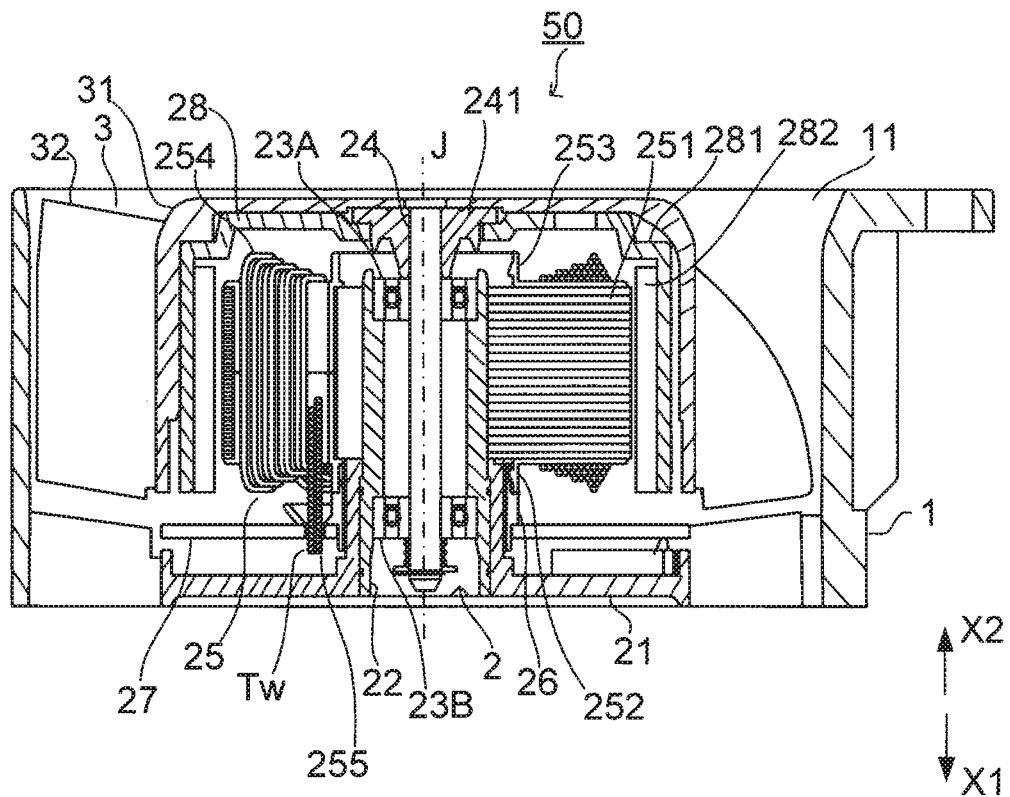
FIG. 1 is a longitudinal sectional view of a blower fan device according to an embodiment of the present invention.

FIG. 1 is a longitudinal sectional view of a blower fan device 50 according to an embodiment of the present invention. The lower side of the sheet of FIG. 1 is the "upper side" in the up-and-down direction. The blower fan device 50 illustrated in FIG. 1 is an axial fan device mounted on various communication devices and generating an air flow for cooling. In FIG. 1, a central axis of a motor 2 is described as a central axis J.

As illustrated in FIG. 1, the blower fan device 50 is provided with a housing 1, the motor 2, and an impeller 3. The housing 1 has a substantially quadrangular outer shape and is formed to include a resin material. The housing 1 has a cavity 11 inside.

The motor 2 has a base portion 21, a bush 22, bearing portions 23A and 23B, a shaft 24, a stator 25, a holding member 26, a circuit board 27, and a rotor 28.

The base portion 21 is a member that supports the bush 22, the bearing portions 23A and 23B, the stator 25, the holding member 26, and the circuit board 27. The base portion 21 is formed as the same member as the housing 1, and is formed to include a resin material. The bush 22 is formed to include a material (metal such as aluminum, for example) different from that of the base portion 21, and is manufactured by insert molding with the base portion 21. The bush 22 may be formed to include a resin material as the same member as the base portion 21.

To the inner circumferential side of the bush 22, a pair of bearing portions 23A and 23B is fixed. The bearing portion 23B is disposed on the upper side from the bearing portion 23A. The bearing portions 23A and 23B are members that rotatably support the shaft 24, and are configured to include ball bearings that relatively rotate an outer ring and an inner ring via a spherical body. Instead of the ball bearing, other types of bearing such as a plain bearing or a hydrodynamic bearing may be used.

The stator 25 has a stator core 251, a first insulator 252, a second insulator 253, a coil 254, and a coil end portion 255.

The stator core 251 includes a laminated steel plate obtained by laminating electromagnetic steel plates such as silicon steel plates in the up-and-down direction. The first insulator 252 and the second insulator 253 are formed to include an insulating resin. The first insulator 252 is attached to the stator core 251 from the upper side. The second insulator 253 is attached to the stator core 251 from the lower side. Detailed configurations of the stator core 251, the first insulator 252, and the second insulator 253 will be described later.

The coil 254 is formed by winding a coil wire on the upper side of the first insulator 252 and the lower side of the second insulator 253. That is, the coil 254 is formed by winding a coil wire around the stator core 251 with the first insulator 252 and the second insulator 253 in between. The stator core 251 and the coil 254 are electrically insulated by the first insulator 252 and the second insulator 253. The coil end portion 255 is the end portion of the coil wire forming the coil 254.

The holding member 26 is formed to include a resin material and is disposed on the upper side of the first insulator 252. The lower portion of the holding member 26 is connected to the upper portion of the first insulator 252. The upper portion of the holding member 26 is connected to the circuit board 27. That is, the circuit board 27 is fixed to the first insulator 252 via the holding member 26.

The circuit board 27 is a board on which an electronic circuit for applying a driving current to the coil 254 is mounted. As will be described later, a plurality of coils 254 are provided in the stator 25. A portion of the plurality of coils 254 are in-phase coils. Each of the coil end portions 255 drawn from the in-phase coils is twisted to form one twisted wire portion Tw. The twisted wire portion Tw penetrates through the holding member 26 and the circuit board 27 in order, is extended to the upper surface side of the circuit board 27 and is electrically connected to the circuit board 27. That is, the twisted wire portion Tw is connected to the circuit board 27 while being held by the holding member 26. The configuration including the stator 25, the holding member 26, and the circuit board 27 will be described later in detail.

The shaft 24 is a columnar member extending in the up-and-down direction, and is formed to include a metal such as stainless steel, for example. The shaft 24 rotates about a central axis J while being supported by a pair of bearing portions 23A and 23B. The lower end portion of the shaft 24 projects downward from the lower end portion of the bush 22. In addition, an annular fixing member 241 is attached to the lower end portion of the shaft 24.

The rotor 28 has a rotor yoke 281 and a magnet 282. The rotor yoke 281 is a cylindrical member having a lid at the lower side, and is formed to include a magnetic material. The rotor yoke 281 is fixed to the shaft 24 via the fixing member 241. On the inner circumferential surface of the rotor yoke 281, the cylindrical magnet 282 is fixed. The magnet 282 is disposed outward in the radial direction of the stator 25. In the magnet 282, the pole surfaces of the inner circumferential side are alternately arranged in N pole and S pole. A magnetic circuit is formed between the rotor yoke 281 and the magnet 282, and leakage magnetic flux from the magnet 282 to the outside of the blower fan device 50 can be reduced.

The impeller 3 has an impeller cup 31 and a plurality of blades 32. The impeller 3 is formed to include a resin material. The impeller cup 31 is a cylindrical member having a lid at the lower side. The rotor yoke 281 is fixed to the inner circumferential surface of the impeller cup 31. A plurality of blades 32 are formed outward in the radial direction of the impeller cup 31.

In the blower fan device 50 having such a configuration, when a driving current is supplied to the coil 254 of the stator 25, a magnetic flux in the radial direction is generated in the stator core 251. A torque in the circumferential direction is generated by the action of the magnetic flux between the stator core 251 and the magnet 282. As a result, the rotating portion which is accommodated in the cavity portion 11 and includes the rotor 28 and the impeller 3 rotates about the central axis J.

When the impeller 3 rotates, an air current is generated by the plurality of blades 32. That is, an air flow is generated with the lower side of the blower fan device 50 on the intake side and the upper side on the exhaust side, and blowing can be performed.

<2. Connection Structure Between Stator and Circuit Board>

The connection structure between the stator 25 and the circuit board 27 in the motor 2 will be described with reference to FIGS. 2 to 7.

Figure 4:
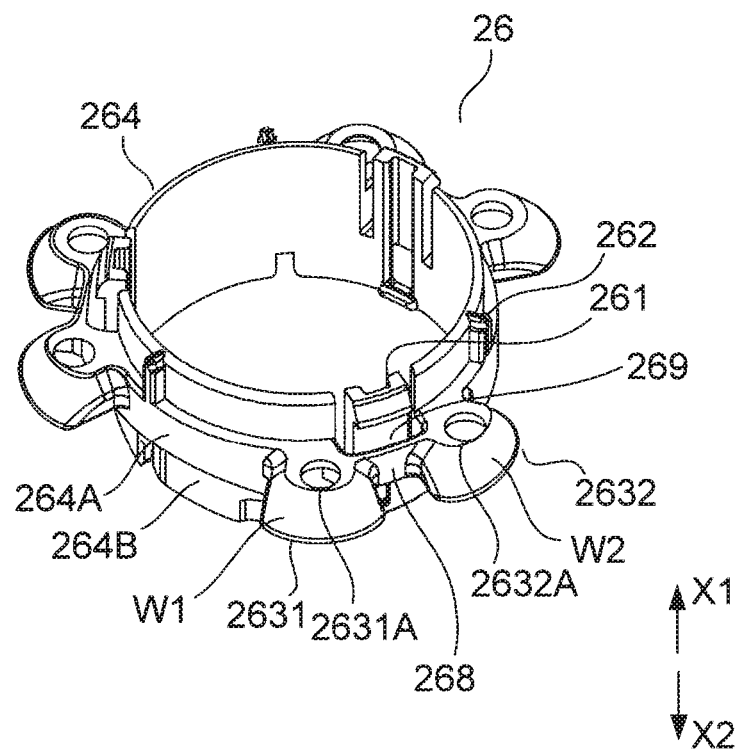
FIG. 4 is a perspective view of the holding member, as viewed from the upper side.

FIG. 4 is a perspective view of the holding member 26, as viewed from the upper side. As illustrated in FIG. 4, the holding member 26 has a tubular cylindrical portion 264. A hook portion 261 and a projecting piece 262 are provided in the upper portion of the cylindrical portion 264. In the present embodiment, the hook portion 261 and the projecting piece 262 are disposed in three in the circumferential direction, respectively. In addition, a pair of coil guide portions 2631 and 2632 are provided so as to project outward in the radial direction from the cylindrical portion 264. The coil guide portions 2631 and 2632 have first through holes 2631A and 2632A, respectively. In the present embodiment, three pairs of the coil guide portions 2631 and 2632 is provided so as to be disposed in the circumferential directions.

Figure 5:
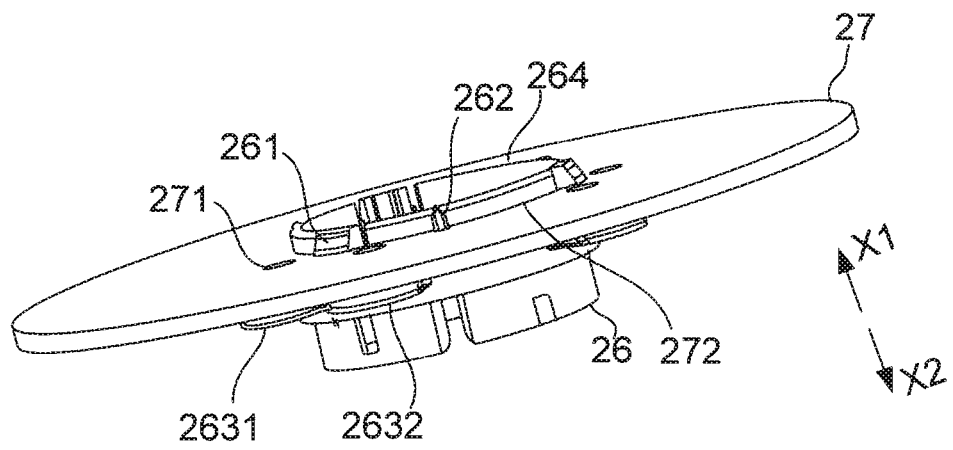
FIG. 5 is a perspective view illustrating a state where the circuit board is fixed to the holding member.

From above the holding member 26, the circuit board 27 is attached to the upper portion of the holding member 26, while performing the snap fit by the hook portion 261 and the positioning by the projecting piece 262. At this time, the cylindrical portion 264 of the holding member 26 is passed through a circular third through hole 272 provided in the circuit board 27. This state is illustrated in FIG. 5. FIG. 5 is a perspective view illustrating a state where the circuit board 27 is fixed to the holding member 26. Here, in the circuit board 27, second through holes 271 are provided corresponding to the first through holes 2631A and 2632A, respectively. The second through holes 271 are provided in six in the circumferential direction. In the state illustrated in FIG. 5, the first through holes 2631A, 2632A are disposed on the lower side of the second through holes 271.

Figure 6:
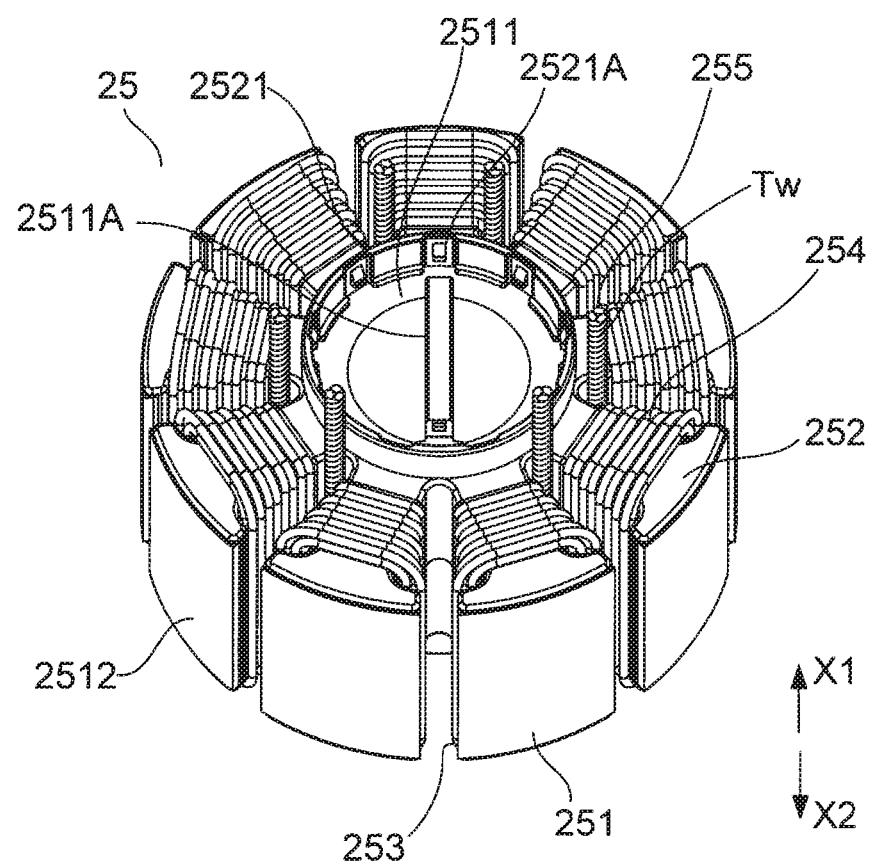
FIG. 6 is a perspective view as viewed from the upper side of the stator.

FIG. 6 is a perspective view as viewed from the upper side of the stator 25. The stator core 251 included in the stator 25 has a cylindrical core back 2511 in the center. On an outer circumferential surface of the core back 2511, a plurality of teeth 2512 project outward in the radial direction. The teeth 2512 are radially disposed about the central axis J and at equal intervals in the circumferential direction. As an example in the embodiment, since the stator 25 of 3 phases and 9 slots is used, nine teeth 2512 are provided. That is, the angle between the adjacent teeth 2512 is 40°.

Figure 7:
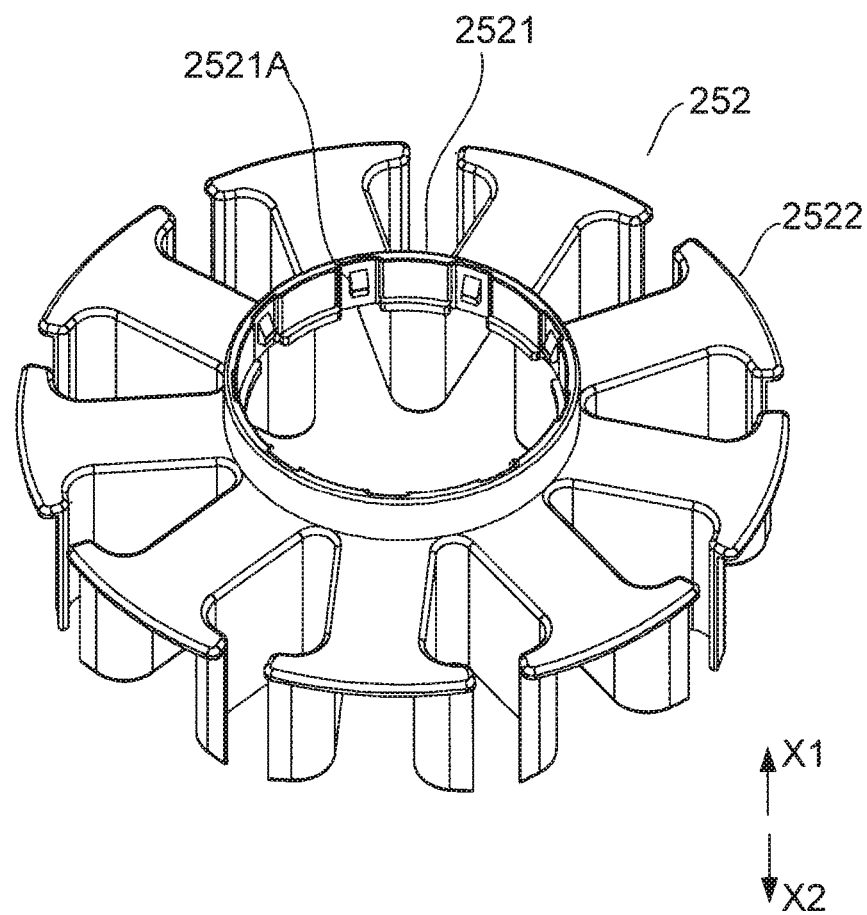
FIG. 7 is a perspective view as viewed from the upper side of the first insulator.

A first insulator 252 is attached from the upper side of the stator core 251. FIG. 7 is a perspective view as viewed from the upper side of the first insulator 252. As illustrated in FIG. 7, the first insulator 252 has an annular portion 2521 in the center. A plurality of cover portions 2522 are radially projected outward in the radial direction from the lower end of the outer circumferential surface of the annular portion 2521. That is, the annular portion 2521 projects upward from the upper surface of the cover portion 2522. The cover portions 2522 correspond to each of the teeth 2512. In the present embodiment, the cover portions 2522 are provided in nine at equal intervals in the circumferential direction.

As illustrated in FIG. 6, when the first insulator 252 is attached to the stator core 251, the annular portion 2521 is disposed on the core back 2511, and the upper surface and both side surfaces in the circumferential direction of each of the teeth 2512 are covered with each of the cover portions 2522.

The second insulator 253 has the same shape as the first insulator 252, and is attached to the stator core 251 from the lower side. At this time, the second insulator 253 is attached to the lower side of the stator core 251, and the lower surface and both side surfaces in the circumferential direction of each of the teeth 2512 are covered with the cover portions of the second insulator 253. That is, the stator core 251 is sandwiched from above and below by the first insulator 252 and the second insulator 253.

In a state where the first insulator 252 and the second insulator 253 are attached to the stator core 251, the coil 254 is wound in the up-and-down direction around each of the teeth 2512 with the first insulator 252 and the second insulator 253 in between. The coil 254 is wound by, for example, a winding machine. The in-phase coil 254 begins to wind from the same point between the adjacent teeth 2512, and becomes the end of winding at the portion between the same adjacent teeth 2512. The coil end portion 255 at the start of winding and the coil end portion 255 at the end of winding are extended above the first insulator 252.

In the present embodiment, the motor 2 has a 3 phases and 9 slots. In that case, three of one coil end portions 255 of the in-phase coil 254 are extended upward at the position between the same adjacent teeth 2512, and three of the other coil end portions 255 are extended upward at another position between the same adjacent teeth 2512. The three coil end portions extended are twisted to form one twisted wire portion Tw. Therefore, as illustrated in FIG. 6, in the stator 25 of the present embodiment, a total of six twisted wire portions Tw are formed extending upward corresponding to three phases.

Figure 2:
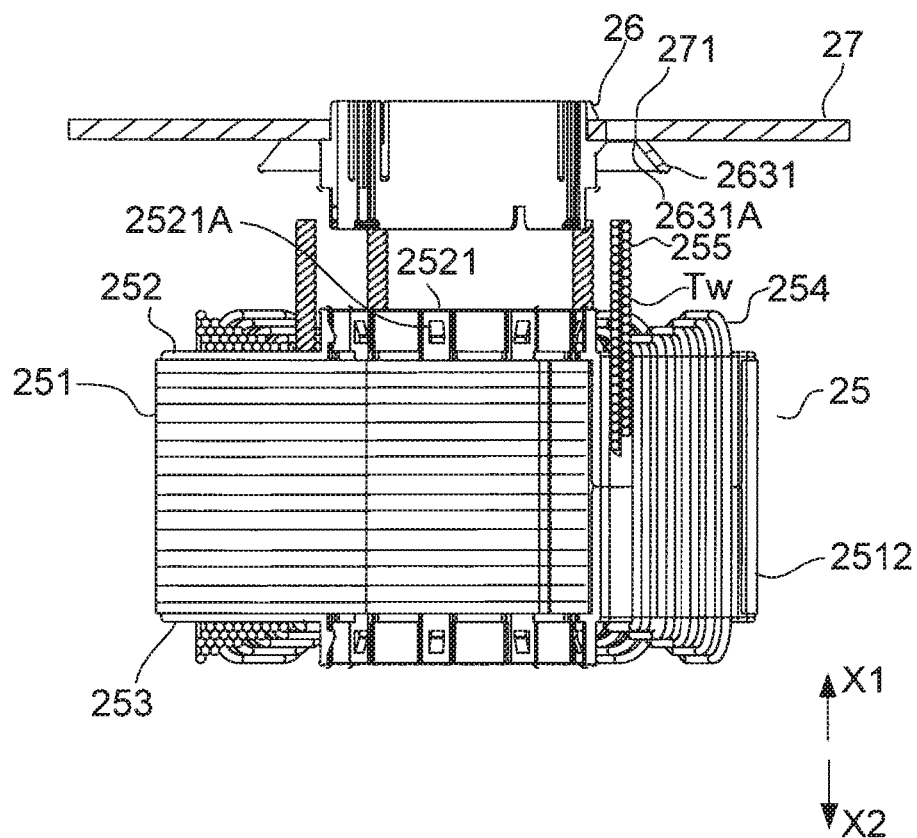
FIG. 2 is a side sectional view in a state where a holding member to which a circuit board is fixed and a stator are separated.

To the stator 25 formed in this manner, as described above, the holding member 26 to which the circuit board 27 is fixed is attached from above. FIG. 2 is a side sectional view in a state where the holding member 26 to which the circuit board 27 is fixed and the stator 25 are separated. As illustrated in FIG. 2, the holding member 26 to which the circuit board 27 is fixed is disposed above the stator 25. The holding member 26 is moved downward, so that the lower portion of the holding member 26 is connected to the annular portion 2521 of the first insulator 252, while passing each of the twisted wire portions Tw in the order of each first through hole 2631A or 2632A, and each second through hole 271. At this time, the projecting portion 2521A provided on the inner circumferential surface of the annular portion 2521 is used for connection by snap fitting or the like. This connection will be described in detail later.

Figure 3:
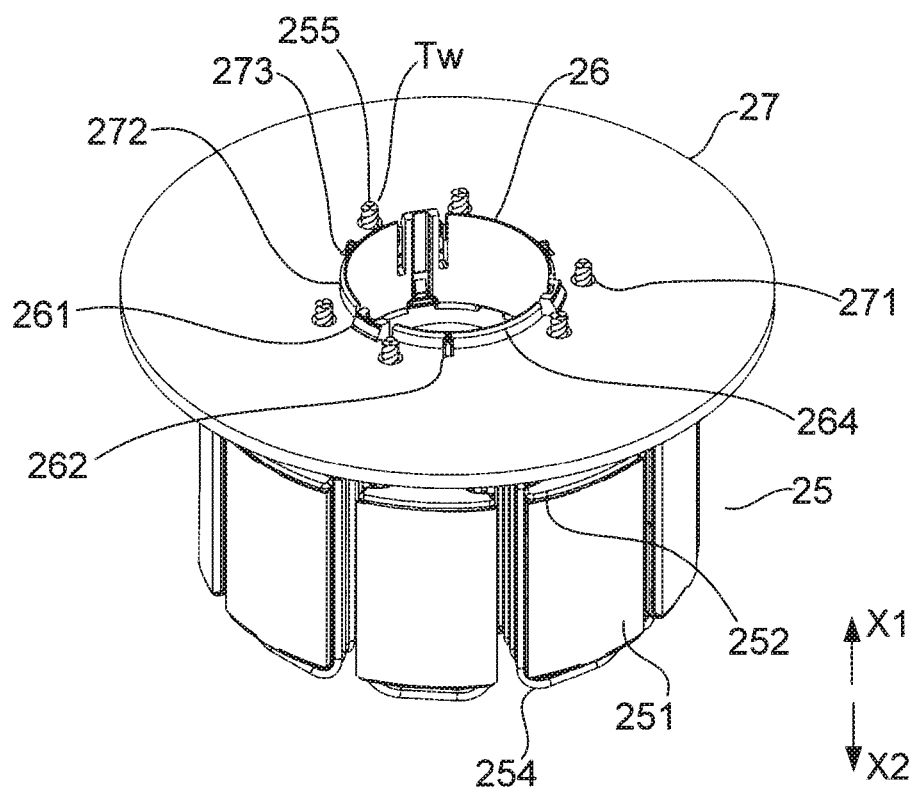
FIG. 3 is a perspective view illustrating a state where the circuit board is fixed to the stator via the holding member, as viewed from the upper side.

In a state where the holding member 26 is fixed to the first insulator 252, the tip end portions of each of the twisted wire portions Tw project upward from each of the second through holes 271. That is, the tip end portions project above the upper surface of the circuit board 27. This state is illustrated in FIG. 3. FIG. 3 is a perspective view illustrating a state where the circuit board 27 is fixed to the stator 25 via the holding member 26, as viewed from the upper side.

In a state of only the stator 25, in the tip end portions of each of the twisted wire portions Tw, the coating is removed by using the heat of the molten solder, and the solder adheres. The tip end portions of each of the twisted wire portions Tw to which the solder is attached and each of the terminal portions (not shown) on the circuit board 27 are electrically connected by soldering to each other.

As described above, the motor 2 of the present embodiment includes the stator 25, the rotor 28 that rotates relatively about a central axis J extending in the up-and-down direction with respect to the stator 25, the circuit board 27, the holding member 26 holding the stator 25 and the circuit board 27.

The stator 25 has the stator core 251, the first insulator 252, the coil 254, and the coil end portion 255. The stator core 251 includes a core back 2511 and a plurality of teeth 2512 radially disposed to the core back 2511 about the central axis J. The first insulator 252 covers at least a portion of the stator core 251. In the coil 254, the coil wire is wound around the teeth 2512 with the first insulator 252 in between. The coil end portion 255 is the end portion of the coil wire.

The holding member 26 has first through holes 2631A and 2632A. The circuit board 27 has a second through hole 271. The first through holes 2631A and 2632A are disposed on a lower side of the second through hole 271. The coil end portion 255 passes through the first through holes 2631A and 2632A and the second through hole 271 and is electrically connected to the circuit board 27. The lower portion of the holding member 26 is connected to the upper portion of the first insulator 252 and the upper portion of the holding member 26 is connected to the circuit board 27.

According to such a configuration, since the circuit board 27 and the first insulator 252 are fixed via the holding member 26, positioning between the first through holes 2631A and 2632A, and the second through hole 271 becomes easy. As a result, the coil end portion 255 which is the end portion of the coil wire constituting the coil 254 can be easily extended to the upper surface of the circuit board 27. Therefore, in the configuration in which the coil end portion is directly connected to the circuit board, the assembling efficiency can be improved. In particular, since the motor 2 is used for the blower fan device 50, it is possible to obtain the effect in a case where the above configuration is adopted by increasing the wire diameter of the coil corresponding to the high power output.

<3. Connection Configuration Between Holding Member and Circuit Board>

A configuration for connecting the upper portion of the holding member 26 to the circuit board 27 will be described in detail. As illustrated in FIG. 4, three hook portions 261 are disposed in the circumferential direction on the upper portion of the cylindrical portion 264 of the holding member 26. The tip end portion of the hook portion 261 has a claw shape and can be elastically deformed inward in the radial direction. When the cylindrical portion 264 of the holding member 26 is passed through the third through hole 272 of the circuit board 27, the hook portion 261 is elastically deformed inward in the radial direction, and the hook portion 261 is caught on the upper surface of the circuit board 27, so that the circuit board 27 is fixed. At this time, on the lower side of the circuit board 27, the coil guide portions 2631 and 2632 of the holding member 26 are disposed. That is, the circuit board 27 is sandwiched between the hook portion 261 and the coil guide portions 2631 and 2632 and fixed.

The upper portion of the holding member 26 has a hook portion 261 for fixing the circuit board 27 by the elastic deformation in the radial direction. As a result, the circuit board 27 and the holding member 26 can be easily connected by snap-fitting.

The hook portion 261 is provided at an upper position between the pair of coil guide portions 2631 and 2632 and is disposed at equal intervals in the circumferential direction. That is, the angle between the adjacent hook portions 261 is 120°. As a result, whatever rotational position the holding member 26 is, the holding member 26 can be fixed to the circuit board 27 by snap-fitting.

The holding member 26 has a projecting piece 262 projecting outward in the radial direction from the upper outer circumferential surface of the cylindrical portion 264. The projecting piece 262, for example, is provided with three. As illustrated in FIG. 3, the circuit board 27 has a first cutout portion 273 cut out outward in the radial direction from the third through hole 272. The first cutout portions 273 are provided in three corresponding to the projecting piece 262. When the cylindrical portion 264 of the holding member 26 is passed through the third through hole 272 of the circuit board 27, each of the projecting pieces 262 is disposed in each of the first cutout portions 273. The projecting piece 262 may be disposed in one in the circumferential direction. In this case, the first cutout portion 273 is provided in one corresponding to the projecting piece 262.

The upper portion of the holding member 26 has at least one projecting piece 262 projecting outward in the radial direction, and the projecting piece 262 is disposed in the first cutout portion 273 of the circuit board 27. As a result, the positioning of the holding member 26 in the circumferential direction with respect to the circuit board 27 can be performed easily.

A plurality of projecting pieces 262 are provided, and the plurality of projecting pieces 262 are disposed at equal intervals in the circumferential direction. That is, the angle between the adjacent projecting pieces 262 is 120°. As a result, whatever rotational position the holding member 26 is, the holding member 26 can be positioned with respect to the circuit board 27.

<4. Connection Configuration of Insulator and Holding Member>

The connection between the upper portion of the first insulator 252 and the lower portion of the holding member 26 will be described in detail.

As illustrated in FIGS. 6 and 7, a plurality of projecting portions 2521A are disposed in the circumferential direction on the inner circumferential surface of the annular portion 2521 of the first insulator 252. The projecting portions 2521A are disposed corresponding to each of the cover portions 2522. In the present embodiment, the projecting portions 2521A are provided in nine in total. The projecting portions 2521A are disposed at equal intervals in the circumferential direction. That is, the angle between the adjacent projecting portions 2521A is 40°. In addition, all the projecting portions 2521A have the same shape.

Figure 8:
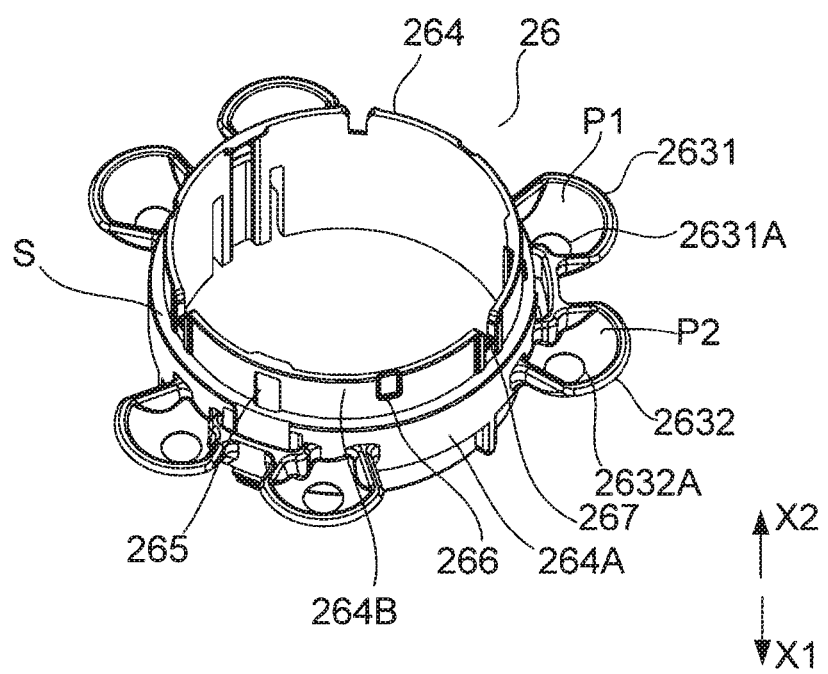
FIG. 8 illustrates a perspective view of the holding member as viewed from the lower side.

On the other hand, FIG. 8 illustrates a perspective view of the holding member 26 as viewed from the lower side. As illustrated in FIG. 8, a plurality of openings 265, recessed portions 266, and a second cutout portions 267 are disposed in the circumferential direction on the outer circumferential surface of the lower portion of the cylindrical portion 264.

The opening 265 is disposed between the pair of coil guide portions 2631 and 2632 at the lower side of the pair of coil guide portions 2631 and 2632. The openings 265 are provided in three in total. The opening 265 penetrates the cylindrical portion 264 in the radial direction. The openings 265 are disposed at equal intervals of 120° in the circumferential direction.

The recessed portion 266 is recessed inward in the radial direction from the outer circumferential surface of the cylindrical portion 264. The recessed portions 266 are provided in three in total. Each of the recessed portions 266 is disposed at a position shifted by 40° from each of the openings 265 counterclockwise as viewed from the lower side. That is, the recessed portions 266 are disposed at equal intervals of 120° in the circumferential direction.

The second cutout portion 267 is cut out upward from the lower end surface of the cylindrical portion 264. The second cutout portions 267 are provided in three in total. Each of the second cutout portions 267 is disposed at a position shifted by 40° from each of the recessed portions 266 counterclockwise as viewed from the lower side. That is, the second cutout portions 267 are disposed at equal intervals of 120° in the circumferential direction.

Therefore, in the outer circumferential surface of the cylindrical portion 264, the opening 265, the recessed portion 266, and the second cutout portion 267 are disposed in the circumferential direction with the adjacent portions being shifted by 40° from each other. The portions in which the opening 265, the recessed portion 266, and the second cutout portion 267 are disposed is in nine in total. Each of the portions corresponds to each of the projecting portions 2521A of the first insulator 252.

More specifically, in the holding member 26, the lower portion of the cylindrical portion 264 has a large diameter portion 264A and a small diameter portion 264B having a smaller outer diameter than the large diameter portion 264A. The small diameter portion 264B is located at the lower side than the large diameter portion 264A. The opening 265, the recessed portion 266, and the second cutout portion 267 are disposed in the outer circumferential surface of the small diameter portion 264B.

Figure 9:
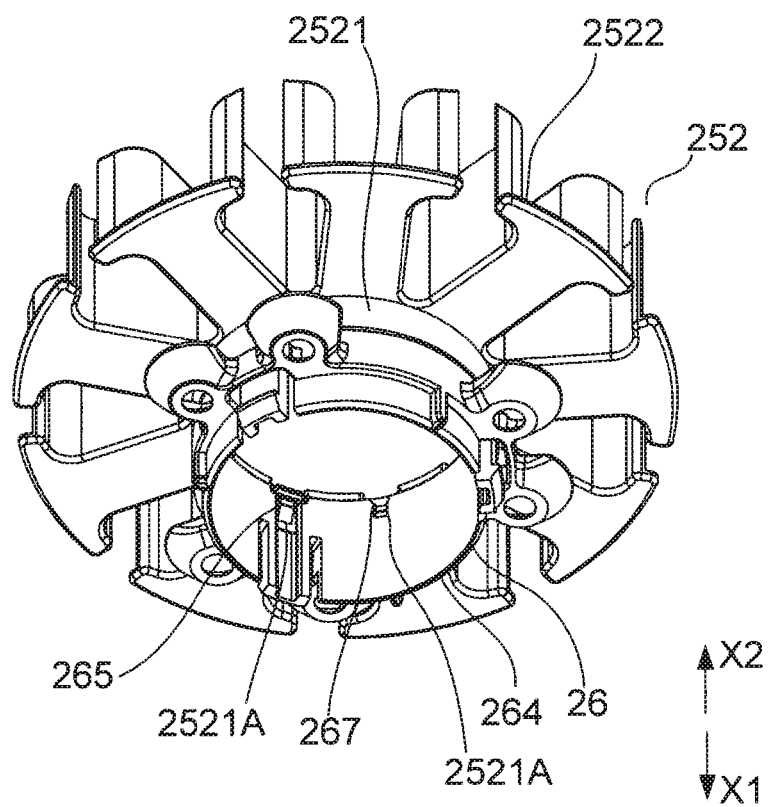
FIG. 9 illustrates a perspective view of a state where the holding member is fixed to the first insulator, as viewed from the upper side.

The opening 265 and the corresponding projecting portion 2521A constitute a pair of snap-fit portions. Here, FIG. 9 illustrates a perspective view of a state where the holding member 26 is fixed to the first insulator 252, as viewed from the upper side. As illustrated in FIG. 9, the small diameter portion 264B of the holding member 26 is fitted inside the annular portion 2521 of the first insulator 252, and the holding member 26 is fixed to the first insulator 252 so that a step S (FIG. 8) between the large diameter portion 264A and the small diameter portion 264B is brought into contact with the upper surface of the annular portion 2521. At this time, the projecting portion 2521A is elastically deformed outward in the radial direction and caught in the opening 265. That is, the fixing by snap fitting is performed.

The recessed portion 266 and the corresponding projecting portion 2521A constitute a pair of fixing portions. As described above, when fixing the holding member 26 to the first insulator 252, the projecting portion 2521A is brought into contact with and fixed to the recessed portion 266 by elastic force due to elastic deformation outward in the radial direction. That is, the recessed portion 266 and the projecting portion 2521A perform a fixing function by press fitting. As a result, centering of the holding member 26 with respect to the first insulator 252 can be performed. By performing alignment by centering, for example, malfunction of a Hall sensor (not shown) provided in the circuit board 27 can be suppressed.

The second cutout portion 267 and the corresponding projecting portion 2521A constitute a pair of positioning portions. As described above, when fixing the holding member 26 to the first insulator 252, the projecting portion 2521A is disposed in the second cutout portion 267 (FIG. 9). As a result, the positioning of the holding member 26 in the circumferential direction with respect to the first insulator 252 can be performed.

The projecting portion 2521A is provided on a one-to-one basis with the cover portion 2522, and all the projecting portions 2521A have the same shape. As a result, even if the first insulator 252 is disposed with respect to the stator core 251 at what rotational position, the function of the projecting portion 2521A can be made effective. Therefore, workability when attaching the first insulator 252 to the stator core 251 can be improved.

Instead of the above embodiment, the projecting portion may be provided on the outer circumferential surface of the lower portion of the holding member 26 and the opening, the recessed portion, and the second cutout portion may be provided on the inner circumferential surface of the annular portion of the first insulator 252.

In the present embodiment, the upper portion of the first insulator 252 and the lower portion of the holding member 26 have a pair of snap-fit portions, and any one of the upper portion of the first insulator 252 and the lower portion of the holding member 26 has a first projecting portion 2521A fixed to the other opening 265.

According to such a configuration, the holding member 26 can be easily fixed to the first insulator 252 by snap-fitting.

The upper portion of the first insulator 252 and the lower portion of the holding member 26 have a pair of fixing portions. Any one of the upper portion of the first insulator 252 and the lower portion of the holding member 26 has the recessed portion 266 recessed in the radial direction from the circumferential surface, and the other portion has a second projecting portion 2521A which is brought in contact with and fixed to the recessed portion 266 by elastic force.

According to such a configuration, the holding member 26 is lightly pressed to the first insulator 252, so that the centering of the holding member 26 can be performed.

The upper portion of the first insulator 252 and the lower portion of the holding member 26 have the pair of positioning portions. Any one of the upper portion of the first insulator 252 and the lower portion of the holding member 26 has the second cutout portion 267 cut out in the up-and-down direction from the end surface, and the other portion has a third projecting portion 2521A disposed in the second cutout portion 267.

According to such a configuration, positioning of the holding member 26 in the circumferential direction can be performed easily.

Any one of the upper portion of the first insulator 252 and the lower portion of the holding member 26 has at least two of a plurality of the first projecting portions, a plurality of the second projecting portions, and a plurality of the third projecting portions. The first projecting portion is fixed to the other opening by elastic deformation in the radial direction. The second projecting portion is brought in contact with and fixed to the recessed portion recessed in the radial direction from the other circumferential surface by elastic force. The third projecting portion is disposed in the second cutout portion cut out in the up-and-down direction from the other end surface. The first projecting portion, the second projecting portion, and the third projecting portion are disposed at equal intervals in the circumferential direction, respectively.

According to such a configuration, the degree of freedom of the rotational position increases when the insulator is disposed with respect to the stator core.

The first projecting portion, the second projecting portion, and the third projecting portion have the same shape. As a result, the degree of freedom of the rotational position further increases when the insulator is disposed with respect to the stator core.

The lower portion of the holding member 26 is disposed inward in the radial direction of the upper portion of the first insulator 252. As a result, it is possible to prevent the wire of the coil 254 from being caught by the holding member 26. In particular, in a case where the crossing wire is present by the coil 254, it is possible to prevent the crossing wire from being caught. The crossing wire is a wire crossing the teeth of different phases.

<5. Configuration for Guiding Coil End Portion>

A configuration for guiding the coil end portion 255 of the coil 254 by the holding member 26 will be described in detail.

As illustrated in FIG. 4, the holding member 26 has a pair of coil guide portions 2631 and 2632. The coil guide portions 2631 and 2632 project outward in the radial direction from the outer circumferential surface of the cylindrical portion 264 and have the first through holes 2631A and 2632A. The coil guide portions 2631 and 2632 have wall portions W1 and W2 extending from the upper portion toward the lower portion. In addition, as illustrated in FIG. 8, the coil guide portions 2631 and 2632 have inclined surfaces P1 and P2 directed downward toward the outer side on the lower surface side.

As a result, even if the twisted wire portion Tw of the stator 25 is disposed at a position shifted in the radial direction and the circumferential direction from directly above, by guiding the tip end portion of the twisted wire portion Tw by the inclined surfaces P1 and P2, the tip end portion can be passed through the first through holes 2631A and 2632A.

The coil guide portions 2631 and 2632 have a fan shape expanding in the circumferential direction toward the outer side in the radial direction, in a plan view. As a result, even in a case where the twisted wire portion Tw deviates in the circumferential direction, the twisted wire portion Tw can be passed through the first through holes 2631A and 2632A. In addition, although the coil guide portion may have, for example, a circular shape, it is possible to increase the mounting area of the circuit board 27 by adopting the fan shape as described above.

The coil guide portions 2631 and 2632 are disposed at equal intervals for each pair in the circumferential direction. That is, the angle between the pair of adjacent coil guide portions is 120°. As a result, whatever rotational position the holding member 26 is, the holding member 26 can be fixed to the first insulator 252 and the circuit board 27.

As illustrated in FIG. 4, the holding member 26 has a connecting portion 268 connecting a pair of coil guide portions 2631 and 2632. As a result, it is possible to reinforce the coil guide portions 2631 and 2632 to which a load is applied by the twisted wire portion Tw.

A hole 269 penetrating in the up-and-down direction is disposed between the outer wall surface of the cylindrical portion 264 and the connecting portion 268. As a result, in a case where the twisted wire portion Tw comes into contact with the inclined surfaces P1 and P2 and a force is applied to the coil guide portions 2631 and 2632, the coil guide portions 2631 and 2632 can be deformed.

The coil guide portions 2631 and 2632 are provided so as to project outward in the radial direction from the outer circumferential surface of the large diameter portion 264A of the cylindrical portion 264 (FIG. 8).

That is, the lower portion of the holding member 26 has a small diameter portion 264B and a large diameter portion 264A having a larger outer diameter than the small diameter portion 264B above the small diameter portion 264B. The lower surface (step S) of the large diameter portion 264A is in contact with the upper end surface of the first insulator 252, the small diameter portion 264B is disposed inward in the radial direction of the upper portion of the first insulator 252, and the coil guide portions 2631 and 2632 are disposed in the large diameter portion 264A.

As a result, in particular, in a case where the crossing wire is present by the coil 254, it is possible to prevent the crossing wire from being caught by the coil guide portions 2631 and 2632.

<6. Regarding Manufacturing Step>

A manufacturing step of a configuration for connecting the stator 25 and the circuit board 27 in the present embodiment will be described. First, a step of winding the coil 254 in the stator 25 will be described.

Figure 10:
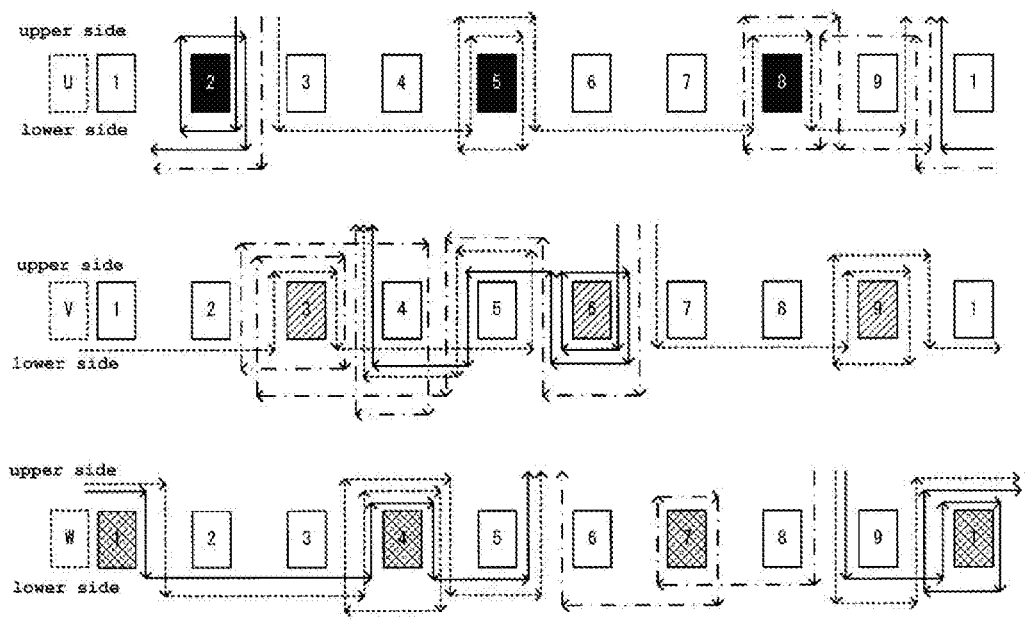
FIG. 10 is a diagram illustrating an example of a winding method for forming coils of three phases (U phase, V phase, and W phase).

FIG. 10 is a diagram illustrating an example of a winding method for forming coils 254 of three phases (U phase, V phase, and W phase). Such winding is performed according to the winding program by the winding machine. As illustrated in FIG. 6, the inner circumferential surface of the core back 2511 of the stator core 251 is provided with a core matching mark 2511A which extends in the up-and-down direction and is recessed like a column outward in the radial direction. The coil is wound by the winding machine with reference to the core matching mark 2511A, so that each phase is determined.

In FIG. 10, the procedure of winding coils of U phase, V phase, W phase in order from the upper stage is illustrated, and the numbers 1 to 9 of each stage indicate the number of each teeth. In addition, the solid line, the broken line, and the one-dot chain line indicate independent coil wires, respectively. The coils are wound around three teeth for each phase.

In the winding of the U phase illustrated in the upper stage of FIG. 10, any of the coil wire of the solid line, the broken line, and the one-dot chain line starts to be wound from above between No. 2 teeth and No. 3 teeth. No. 2 teeth are wound by the coil wire of the solid line, No. 5 teeth are wound by the coil wire of the broken line, No. 8 teeth are wound by the coil wire of the one-dot chain line, and the coils 254 are formed at each teeth. Any coil wires finish winding above between No. 9 teeth and No. 1 teeth. Accordingly, at the stage where the winding of the U phase is completed, three coil end portions 255 extending upward from between the No. 2 teeth and No. 3 teeth, and three coil end portions 255 extending upward from between No. 9 teeth to No. 1 teeth are formed.

In the winding of the V phase illustrated in the middle stage of FIG. 10, any of the coil wire of the solid line, the broken line, and the one-dot chain line starts to be wound from above between No. 6 teeth and No. 7 teeth. No. 6 teeth are wound by the coil wire of the solid line, No. 9 teeth are wound by the coil wire of the broken line, No. 3 teeth are wound by the coil wire of the one-dot chain line, and the coils 254 are formed at each teeth. Any coil wires finish winding above between No. 3 teeth and No. 4 teeth. Accordingly, at the stage where the winding of the V phase is completed, three coil end portions 255 extending upward from between the No. 6 teeth and No. 7 teeth, and three coil end portions 255 extending upward from between No. 3 teeth to No. 4 teeth are formed.

In the winding of the W phase illustrated in the lower stage of FIG. 10, any of the coil wire of the solid line, the broken line, and the one-dot chain line starts to be wound from above between No. 8 teeth and No. 9 teeth. No. 1 teeth are wound by the coil wire of the solid line. No. 4 teeth are wound by the coil wire of the broken line. No. 7 teeth are wound by the coil wire of the one-dot chain line. As a result, the coils 254 are formed at each teeth. Any coil wires finish winding above between No. 5 teeth and No. 6 teeth. Accordingly, at the stage where the winding of the W phase is completed, three coil end portions 255 extending upward from between the No. 8 teeth and No. 9 teeth, and three coil end portions 255 extending upward from between No. 5 teeth to No. 6 teeth are formed.

The three coil end portions 255 of each pair, which are formed in this manner, is twisted to form one twisted wire portion Tw. Accordingly, in the stator 25, six twisted wire portions Tw in total are formed. The six twisted wire portions Tw are disposed in the first through holes 2631A and 2632A and the second through hole 271, respectively. That is, the plurality of the coil end portions 255 are twisted and disposed in the first through holes 2631A and 2632A and the second through hole 271.

As a result, a step of removing the coating with molten solder or the like can be performed in a state where the plurality of the coil end portions 255 are bundled. Furthermore, it is easy to pass the coil end portion through the first through hole and the second through hole.

Figure 11A:
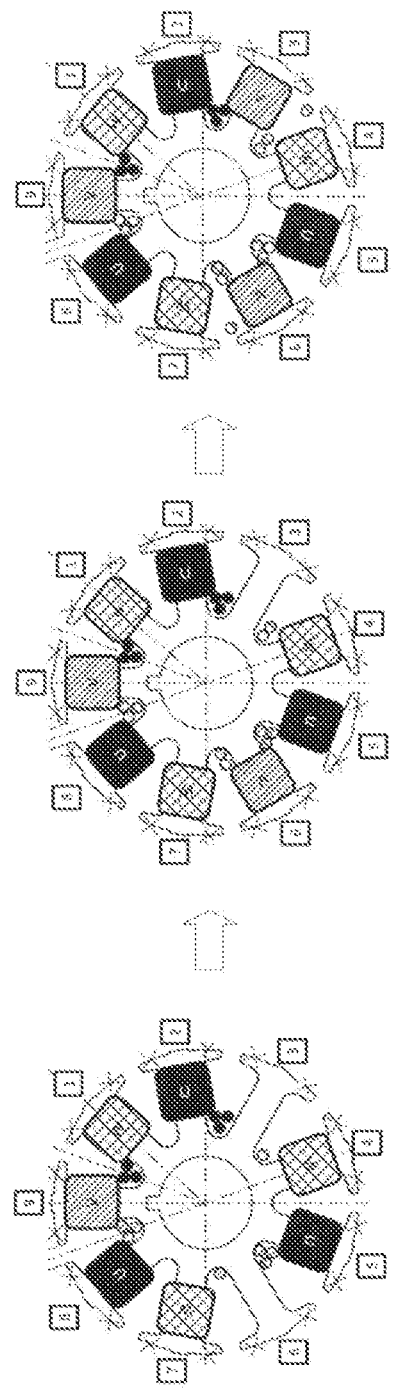
FIG. 11A is a diagram illustrating a first pattern in a case of winding in the order of the U phase, the W phase, and the V phase in a winding procedure illustrated in FIG. 10.

FIG. 11A is a diagram illustrating a first pattern in a case of winding in the order of the U phase, the W phase, and the V phase in a winding procedure illustrated in FIG. 10. In FIG. 11A, each teeth of the stator core is numbered 1 to 9. In addition, a configuration represented as U, V, and W illustrates the coils formed by being wound around each tooth.

The left end of FIG. 11A illustrates the state where the winding of the U phase and W phase coil wires is already completed. Accordingly, the U phase coils are formed on each of No. 2, No. 5, and No. 8 teeth. Three coil end portions are extended to the inner circumferential side between No. 2 teeth and No. 3 teeth, and the inner circumferential side between No. 9 teeth and No. 1 teeth, respectively. Furthermore, coils of W phase are formed on each of No. 1, No. 4, and No. 7 teeth, and three coil end portions are extended to the inner circumferential side between No. 8 teeth and No. 9 teeth, and the inner circumferential side between No. 5 teeth and No. 6 teeth, respectively.

In the left end of FIG. 11A, winding of the V phase is performed by the coil wire of the broken line in FIG. 10. The winding starts from the inner circumferential side between No. 6 teeth and No. 7 teeth, the coil wire is wound around No. 9 teeth, and the winding is completed on the inner circumferential side between No. 3 teeth and No. 4 teeth.

That is, three coil end portions are disposed on the inner circumferential side between No. 8 and No. 9 teeth and between No. 9 and No. 1 teeth, respectively, and the coil wire is wound around No. 9 teeth in a state where the coil wire is wound around No. 8 and No. 1 teeth.

In the center of FIG. 11A, winding of the V phase is performed by the coil wire of the solid line in FIG. 10. The winding starts from the inner circumferential side between No. 6 teeth and No. 7 teeth, the coil wire is wound around No. 6 teeth, and the winding is completed on the inner circumferential side between No. 3 teeth and No. 4 teeth.

That is, two and three coil end portions are disposed on the inner circumferential side between No. 7 and No. 6 teeth and between No. 6 and No. 5 teeth, respectively, and the coil wire is wound around No. 6 teeth in a state where the coil wire is wound around No. 7 and No. 5 teeth.

In the right end of FIG. 11A, winding of the V phase is performed by the coil wire of the one-dot chain line in FIG. 10. Since the coil wires are already wound around No. 6 teeth and No. 7 teeth, the coil wire starts to be wound from the outer circumference side between No. 6 teeth and 7 teeth. The coil wire is wound around No. 3 teeth. Since the coil wires are already wound around No. 3 teeth and No. 4 teeth, the winding is completed on the outer circumference side between No. 3 teeth and 4 teeth.

That is, three coil end portions are disposed on the inner circumferential side between No. 2 and No. 3 teeth, two coil end portions are disposed on the inner circumferential side between No. 3 and No. 4 teeth, and the coil wire is wound around No. 3 teeth in a state where the coil wire is wound around No. 2 and No. 4 teeth.

With such a winding procedure, it is possible to constitute a state where at least one coil end portion is disposed on the inner circumferential side between any adjacent teeth. That is, it is possible to avoid a situation where all three coil end portions are disposed on the outer circumferential side between the adjacent teeth. As a result, it is possible to twist the three coil end portions 255 to constitute one twisted wire portion Tw and to electrically connect to the circuit board 27.

Figure 11B:
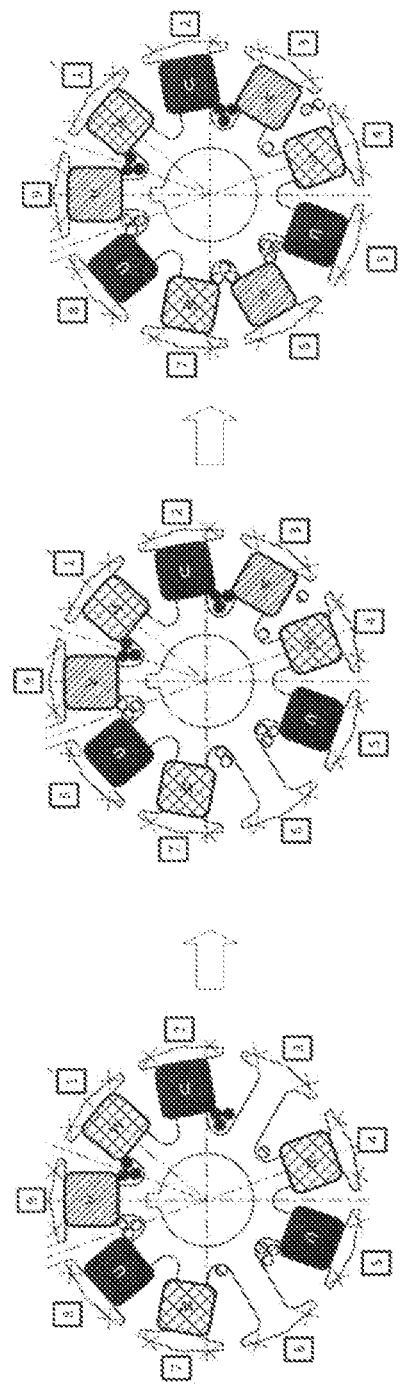
FIG. 11B is a diagram illustrating a second pattern in a case of winding in the order of the U phase, the W phase, and the V phase in the winding procedure illustrated in FIG. 10.

A winding pattern different from FIG. 11A is illustrated in FIG. 11B. 11B illustrates a procedure of winding in the order of U phase, W phase, and V phase in the same manner as in FIG. 11A. Unlike FIG. 11A, when winding the V phase, winding is performed in the order of the coil wire of the broken line, the one-dot chain line, and the solid line in FIG. 10. Even with such a winding procedure illustrated in FIG. 11B, the same effect as in FIG. 11A can be obtained from the same principle as in FIG. 11A.

That is, in the present embodiment, at least one of the plurality of the coil end portions disposed between the adjacent teeth is disposed at the inner circumferential side of the teeth. As a result, it is possible to twist the plurality of the coil end portions to constitute one twisted wire portion Tw and to electrically connect the twisted wire portion Tw to the circuit board 27.

As described above, a method of manufacturing the motor 2 according to the present embodiment is the method of manufacturing the motor 2 including the stator 25, the rotor 28 rotating relatively about a central axis J extending in the up-and-down direction with respect to the stator 25, the holding member 26 having the first through holes 2631A and 2632A, and the circuit board 27 having the second through hole 271.

The method of manufacturing includes a removing step, a first connecting step, and a second connecting step. The removing step removes the coating of the coil end portion 255 in the stator 25. The first connecting step connects the circuit board 27 to the holding member 26 so that the first through holes 2631A and 2632A and the second through hole 271 face each other in the up-and-down direction. The second connecting step connects the holding member 26 to which the circuit board 27 is connected to the first insulator 252, and passes the coil end portion 255 through the first through holes 2631A and 2632A and the second through hole 271. The stator 25 has the stator core 251, the first insulator 252, the coil 254, and the coil end portion 255. The stator core 251 includes the core back 2511 and the plurality of the teeth 2512 disposed to the core back 2511 radially about the central axis J. The first insulator 252 covers at least a portion of the stator core 251. In the coil 254, the coil wire is wound around the teeth 2512 with the first insulator 252 in between. The coil end portion 255 is an end portion of the coil wire.

As a result, since the circuit board 27 and the first insulator 252 are fixed to each other via the holding member 26, the positioning of the first through holes 2631A and 2632A and the second through hole 271 becomes easy. Therefore, it is easy to extend the coil end portion 255 to the upper surface of the circuit board 27.

Since the length of the coil end portion 255 can be lengthened only by the height of the holding member 26, the first insulator 252 is not melted even if the step of removing the coating by soldering or the like is performed while the coil end portion 255 is extended from the upper surface side of the stator 25. In addition, before connecting the holding member 26 to which the circuit board 27 is connected to the first insulator 252, the removing step of removing the coating of the coil end portion 255 can be performed. Accordingly, it is not necessary to extend the stator to the upper side, after removing the coating in a state where the coil end portion is extended from the lower side of the stator.

In addition, the method of manufacturing the motor 2 of the present embodiment further includes a coil winding step of winding the coil 254 around the stator core 251 and the first insulator 252. in the coil winding step, at least one coil end portion 255 is disposed on the inner circumferential side between the first teeth included in the teeth 2512 and the second teeth adjacent to the first teeth, at least one coil end portion 255 is disposed on the inner circumferential side between the second teeth and the third teeth adjacent to the second teeth, and the coil 254 is wound around the second teeth in a state where the coil 254 is wound around the first teeth and the third teeth.

As a result, the coil can be wound so that at least one coil end portion is positioned on the inner circumferential side between any of the teeth. That is, it is possible to avoid that all the coil end portions disposed between the teeth are positioned on the outer circumferential side.

In the present embodiment, the stator 25 has the pair of insulators 252 and 253 covering the upper side and the lower side of the stator core 251, and the pair of the insulators 252 and 253 have the same shape.

As a result, when setting the members assembled from the stator core 251 and the insulators 252 and 253 on the winding machine, it is unnecessary to consider the top and bottom, so the work efficiency is improved. In addition, it is possible to make one type of mold of the insulator.

Hereinbefore, although the embodiment of the present invention is described, various modifications can be made to the embodiment as long as they are within the scope of the gist of the present invention.

The present invention can be suitably used, for example, for a fan motor mounted on a blower fan device.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a stator;
a rotor that rotates relatively about a central axis extending in an up-and-down direction with respect to the stator;
a circuit board; and
a holding member that holds the stator and the circuit board, wherein
the stator includes
a stator core which includes a core back and a plurality of teeth disposed to the core back radially about the central axis,
an insulator which covers at least a portion of the stator core,
a coil in which a coil wire is wound around the teeth with the insulator in between, and
a coil end portion which is an end portion of the coil wire,
the holding member has a first through hole,
the circuit board has a second through hole,
the first through hole is disposed on a lower side of the second through hole,
the coil end portion passes through the first through hole and the second through hole and is electrically connected to the circuit board,
a lower portion of the holding member is connected to an upper portion of the insulator, and
an upper portion of the holding member is connected to the circuit board.

2. The motor according to claim 1,
wherein the upper portion of the holding member has at least one hook portion that fixes the circuit board by an elastic deformation in a radial direction.

3. The motor according to claim 2, wherein
the at least one hook portion includes two or more hook portions disposed at equal intervals in a circumferential direction.

4. The motor according to claim 1, wherein
the upper portion of the holding member has at least one projecting piece that projects outward in the radial direction, and
the projecting piece is disposed in a first cutout portion of the circuit board.

5. The motor according to claim 4, wherein
the at least one projecting piece includes two or more projecting pieces, and
the two or more projecting pieces are disposed at equal intervals in the circumferential direction.

6. The motor according to claim 1, wherein
the upper portion of the insulator and the lower portion of the holding member have a pair of snap-fit portions, and any one of the upper portion of the insulator and the lower portion of the holding member has a first projecting portion which is fixed to an opening of the other of the upper portion of the insulator and the lower portion of the holding member.

7. The motor according to claim 1, wherein
the upper portion of the insulator and the lower portion of the holding member have a pair of fixing portions, any one of the upper portion of the insulator and the lower portion of the holding member has a recessed portion which is recessed in the radial direction from the circumferential surface, and
the other of the upper portion of the insulator and the lower portion of the holding member has a second projecting portion which is in contact with the recessed portion and fixed by elastic force.

8. The motor according to claim 1, wherein
the upper portion of the insulator and the lower portion of the holding member have a pair of positioning portions, any one of the upper portion of the insulator and the lower portion of the holding member has a second cutout portion which is cutout in the up-and-down direction from an end surface, and
the other of the upper portion of the insulator and the lower portion of the holding member has a third projecting portion which is disposed in the second cutout portion.

9. The motor according to claim 1, wherein
any one of the upper portion of the insulator and the lower portion of the holding member has at least two of a plurality of first projecting portions fixed, by elastic deformation in the radial direction, to openings of the other of the upper portion of the insulator and the lower portion of the holding member,
a plurality of second projecting portions in contact with and fixed to, by elastic force, recessed portions recessed in the radial direction from a circumferential surface of the other of the upper portion of the insulator and the lower portion of the holding member, and
a plurality of third projecting portions disposed in a second cutout portion cutout in the up-and-down direction from an end surface of the other of the upper portion of the insulator and the lower portion of the holding member, and
the plurality of first projecting portions, the plurality of second projecting portions, and the plurality of third projecting portions are respectively disposed at equal intervals in the circumferential direction.

10. The motor according to claim 9, wherein
the plurality of first projecting portion, the plurality of second projecting portion, and the plurality of third projecting portion are identical in shape.

11. The motor according to claim 1, wherein
the lower portion of the holding member is disposed inside in the radial direction of the upper portion of the insulator.

12. The motor according to claim 1, wherein
the holding member includes
a cylindrical portion in a tubular shape, and
at least one coil guide portion which projects outward in the radial direction from an outer circumferential surface of the cylindrical portion and is provided with the first through hole,
the coil guide portion has a wall portion which extends from an upper portion toward a lower portion with an area of the wall portion increasing from the upper portion toward the lower portion, and
the wall portion has an inclined surface which extends downward toward an outer side of the wall portion.

13. The motor according to claim 12, wherein
the coil guide portion has a fan shape which extends in the circumferential direction outward in the radial direction in plan view.

14. The motor according to claim 12, wherein
the at least one coil guide portion includes two or more coil guide portions disposed at equal intervals by each pair in the circumferential direction.

15. The motor according to claim 14, wherein
the holding member has a connecting portion which connects the pair of coil guide portions to each other.

16. The motor according to claim 15, wherein
a hole which penetrates in the up-and-down direction is disposed between an outer wall surface of the cylindrical portion and the connecting portion.

17. The motor according to claim 12, wherein
the lower portion of the holding member includes
a small diameter portion, and
a large diameter portion which has an outer diameter larger than an outer diameter of the small diameter portion above the small diameter portion,
a lower surface of the large diameter portion is in contact with an upper end surface of the insulator, and the small diameter portion is disposed inside in the radial direction of the upper portion of the insulator, and
the coil guide portion is disposed in the large diameter portion.

18. The motor according to claim 1, wherein
two or more coil end portions, each of which is the coil end portion, are twisted and disposed in the first through hole and the second through hole.

19. The motor according to claim 1, wherein
at least one of two or more coil end portions, each of which is the coil end portion, disposed between adjacent teeth is disposed on an inner circumferential side of the teeth.

20. The motor according to claim 1, wherein
the stator has insulators which form a pair and cover an upper side and a lower side of the stator core, and
the insulators have an identical shape.

* * * * *